(12) United States Patent
Baldwin et al.

(10) Patent No.: US 9,268,761 B2
(45) Date of Patent: Feb. 23, 2016

(54) IN-LINE DYNAMIC TEXT WITH VARIABLE FORMATTING

(75) Inventors: Christopher Baldwin, Seattle, WA (US); Nicoleta Chistache, Redmond, WA (US); Christopher Alan Hays, Monroe, WA (US); Rajeev Karunakaran, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 413 days.

(21) Appl. No.: 12/478,866

(22) Filed: Jun. 5, 2009

(65) Prior Publication Data

US 2010/0313119 A1 Dec. 9, 2010

(51) Int. Cl.
*G06F 17/00* (2006.01)
*G06F 17/24* (2006.01)

(52) U.S. Cl.
CPC .................................. *G06F 17/248* (2013.01)

(58) Field of Classification Search
CPC ... G06F 17/243; G06F 17/248; G06F 17/211; G06F 17/30861
USPC ........................ 715/255, 234, 264, 235, 256
See application file for complete search history.

(56) References Cited

U.S. PATENT DOCUMENTS

| | | | |
|---|---|---|---|
| 4,815,029 A | 3/1989 | Barker et al. | |
| 5,761,650 A | 6/1998 | Munsil et al. | |
| 6,826,727 B1 * | 11/2004 | Mohr et al. | 715/235 |
| 7,434,164 B2 | 10/2008 | Salesin et al. | |
| 7,554,689 B2 * | 6/2009 | Tonisson | 358/1.18 |
| 8,527,870 B2 * | 9/2013 | Elkady | 715/243 |
| 2002/0049702 A1 * | 4/2002 | Aizikowitz et al. | 707/1 |
| 2004/0049345 A1 | 3/2004 | McDonough et al. | |
| 2004/0135805 A1 * | 7/2004 | Gottsacker et al. | 345/751 |
| 2005/0132284 A1 | 6/2005 | Lloyd et al. | |
| 2006/0129913 A1 * | 6/2006 | Vigesaa et al. | 715/503 |
| 2006/0184876 A1 * | 8/2006 | Ota et al. | 715/517 |
| 2007/0101252 A1 * | 5/2007 | Chamberlain et al. | 715/503 |
| 2007/0157078 A1 | 7/2007 | Anderson | |
| 2008/0189639 A1 * | 8/2008 | Iyer et al. | 715/771 |
| 2008/0294479 A1 * | 11/2008 | Emling et al. | 707/10 |

OTHER PUBLICATIONS

"Dynamic Text", Retrieved at <<http://livedocs.adobe.com/dreamweaver/8/using/36_addi3.htm#73530>>, Adobe Systems Incorporated, May 1, 2009, p. 1.

(Continued)

*Primary Examiner* — Kavita Padmanabhan
*Assistant Examiner* — Ariel Mercado
(74) *Attorney, Agent, or Firm* — Danielle Johnston Holmes; Micky Minhas

(57) ABSTRACT

Techniques for configuring a dynamic document template and for generating formatted documents based thereon are provided. A data source is associated with a dynamic document template. Static text is inserted into the template. One or more placeholders are inserted in the template. Expressions may be associated with static text and placeholders in the template. Each expression may reference one or more data elements of the data source. One or more formatted documents may be generated based on the dynamic document template. In the case of placeholders, a data element referenced by an expression associated with a placeholder may be displayed in a formatted document in place of the placeholder in a display format (e.g., a color, a font type, etc.) selected according to the expression. Likewise, a display format of static text may be selected based on an expression associated with the static text.

20 Claims, 10 Drawing Sheets

(56) References Cited

OTHER PUBLICATIONS

"Mail Merge (Dynamic Update of Fields)", Retrieved at <<http://www.wpcubed.com/products/wptools/mailmerge.htm>>, WPCubed GmBH, May 4, 2009, pp. 1-2.

"How to Use Conditional Formatting in Spreadsheets", Retrieved at <<http://www.dslimited.biz/excel_tutorials/conditionalformatting.html>>, Digital Solutions Limited, May 4, 2009, p. 3.

* cited by examiner

1700

1702 — retrieve a second data element referenced by a second expression associated with a detected second placeholder in the dynamic document template 1704 — evaluate the second expression to determine a data value 1706 — include the data value in the formatted document in place of the detected second placeholder

1802 — retrieve a second data element referenced by a second expression associated with a portion of the detected static text in the dynamic document template 1804 — evaluate the second expression to select a second display attribute 1806 — configure the portion of static text to be displayed according to the selected second display attribute

FIG. 18

IN-LINE DYNAMIC TEXT WITH VARIABLE FORMATTING

BACKGROUND

Electronic reports may include static text and dynamic text. Static text is text of an electronic report that does not change from one version of the electronic report to another version (e.g., "boilerplate"). Dynamic text is text of an electronic report that may change from one version of the electronic report to another version. In some cases, the dynamic text may be provided from a source outside of the electronic report, such as a database field, an expression, a web service, or another external source. Techniques are desired for defining strings of static text that are interspersed with strings of dynamic text in electronic reports.

A "mail merge" tool is a type of tool that enables multiple versions of a report to be generated from a base document that is a combination of static text and dynamic data. Mail merge tools are typically used for creating personalized letters, pre-addressed envelopes, and/or mailing labels for mass mailings. Some examples of word processors that include mail merge capability include WordPerfect®, published by Corel Corporation of Ottawa, Canada, Microsoft® Word, published by Microsoft Corporation of Redmond, Wash., and Lotus® Word Pro®, published by IBM Corporation of Armonk, N.Y.

Currently available mail merge tools, however, have undesirable limitations. Examples of such limitations include a lack of control over the appearance of the contents of various versions of a document, inflexibility in document formats, and difficulties in binding dynamic text with external sources of data.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques are provided for configuring a dynamic document template, and at runtime, generating formatted documents based thereon. Static text and dynamic text may be present in the dynamic document template, such that the static text is the same in each formatted document, while the dynamic text may vary between formatted documents. A user interface and a declarative language may be used to define the dynamic text in an output-format independent manner. Various display formats can be applied to both the static text and the dynamic text that are selected at runtime using data and logic from any number of different sources.

For instance, in one implementation, a method for configuring a dynamic document is provided. A data source is enabled to be associated with a dynamic document template. Static text is enabled to be inserted into the dynamic document template. A placeholder is enabled to be inserted in the dynamic document template. An expression is enabled to be associated with the placeholder in the dynamic document template. The expression references a data element of the data source to be displayed in place of the placeholder (at runtime). Furthermore, the expression may be configured to select a display attribute for the data element.

Furthermore, a second expression may be associated with a second placeholder inserted in the dynamic document template. The second expression references a second data element of the data source. The second expression is configured to determine a data value to be displayed in place of the second placeholder based at least on the second data element.

Still further, a third expression may be associated with a portion of the static text. The third expression references a third data element of the data source. The third expression is configured to select a display attribute for the portion of static text based at least on the third data element.

In another implementation, a method for generating a formatted document is provided. A dynamic document template is received. A formatted document is generated based on the dynamic document template. Static text is detected in the dynamic document template. One or more placeholders are detected in the dynamic document template. The detected static text is included in the formatted document. A data element is retrieved from a data source associated with the dynamic document template. The data element is referenced by an expression associated with a detected placeholder in the dynamic document template. The expression is evaluated to select a display attribute. The data element is included in the formatted document in place of the placeholder, and is configured for display according to the selected display attribute.

Furthermore, a second data element may be retrieved that is referenced by a second expression associated with a detected second placeholder in the dynamic document template. The second expression is evaluated to determine a data value. The data value is included in the formatted document in place of the detected second placeholder.

Still further, a third data element may be retrieved that is referenced by a third expression associated with a portion of the detected static text in the dynamic document template. The third expression is evaluated to select a second display attribute. The portion of static text is configured to be displayed according to the selected second display attribute.

In another implementation, a document configurer is provided. The document configurer includes a template editor. The template editor includes a text editor module, a placeholder designator module, a display attribute module, and an expression editor module. The text editor module is configured to enable text (e.g., static text) to be edited (e.g., added, deleted, modified) by a user in a dynamic document template. Placeholder designator module is configured to designate one or more placeholders (e.g., dynamic text) in the dynamic document template. Display attribute module is configured to enable display attributes for static text and/or dynamic text to be configured in the dynamic document template. Expression editor module is configured to enable a user to configure one or more expressions in the dynamic document template that are associated with the static text and/or dynamic text.

In still another implementation, a document generator is provided. The document generator includes a document formatter. The document formatter includes a static text recognizer, a placeholder recognizer, an expression evaluator, and a text formatter. The document formatter is configured to receive a dynamic document template and to generate a formatted document. The static text recognizer is configured to detect static text in the dynamic document template. The placeholder recognizer is configured to detect one or more placeholders in the dynamic document template. The document formatter is configured to include the static text in the formatted document, and to retrieve from a data source associated with the dynamic document template a data element referenced by an expression associated with a detected placeholder in the dynamic document template. The expression evaluator is configured to evaluate the expression to select a display attribute. The text formatter is configured to include the data element in the formatted document in place of the placeholder. The data element is configured for display according to the selected display attribute by the text formatter.

Computer systems and computer program products (stored on a computer readable medium) are also described herein that are capable of performing and/or enabling the methods described above and elsewhere herein, including configuring a dynamic document template, generating formatted documents based on a dynamic document template, and for implementing further embodiments as described herein.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

FIG. 17 shows a flowchart providing a process for determining data values to be displayed in place of a placeholder, according to an example embodiment.

FIG. 18 shows a flowchart providing a process for determining a display attribute to be applied to static text in a formatted document, according to an example embodiment.

Figure 1:
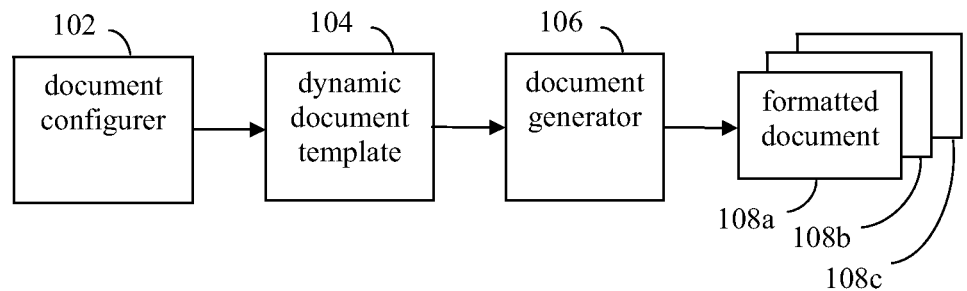
FIG. 1 shows a block diagram of a report generating system, according to an example embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

II. Example Embodiments

Embodiments of the present invention relate to techniques for generating document templates, and for generating multiple versions of a dynamic document based on a document template. For instance, FIG. 1 shows a block diagram of a report generating system 100, according to an example embodiment. System 100 is configured to enable generation of a document template representative of a dynamic document, and to enable multiple versions of the dynamic document to be generated based on the document template. As shown in FIG. 1, system 100 includes a document configurer 102 and a document generator 106. Document configurer 102 is configured to generate a dynamic document template 104. Document generator 106 may receive dynamic document template 104, and is configured to generate one or more formatted documents 108 based on dynamic document template 104. Any number of formatted documents 108 may be generated, including tens, hundreds, thousands, and even greater numbers of formatted documents 108 (three formatted documents 108a-108c are shown in FIG. 1, for illustrative purposes).

In embodiments, system 100 enables the display formatting of text in formatted documents 108 to be dynamically variable. For example, in an embodiment, the display of text in formatted documents 108 may be variable based on one or more expressions associated with the text in dynamic document template 104.

Figure 2:
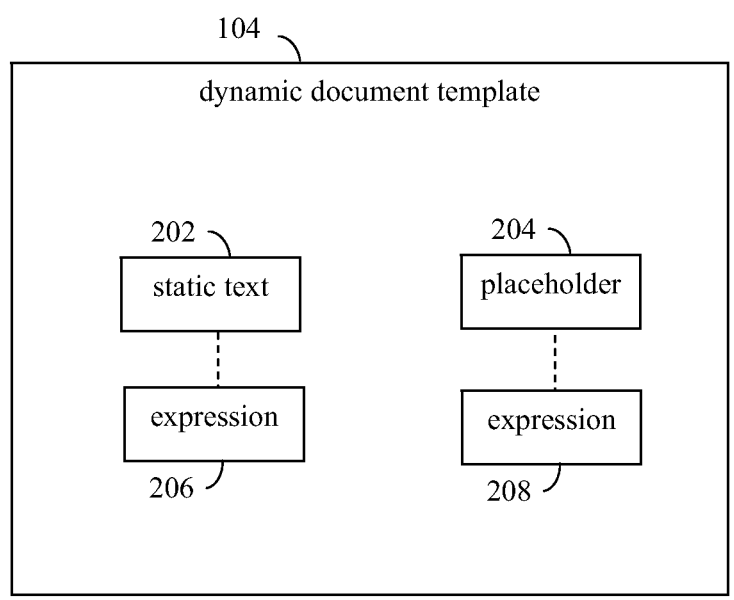
FIG. 2 shows a block diagram of dynamic document template, according to an example embodiment.

For instance, FIG. 2 shows a block diagram of dynamic document template 104, according to an example embodiment. As shown in FIG. 2, dynamic document template 104 may include a static text 202, a placeholder 204, a first expression 206, and a second expression 208. Static text 202 is text of dynamic document template 104 that does not change from one version to another version of formatted document 108 (e.g., is the same in formatted documents 108a-108c). Placeholder 204 is a placeholder for dynamic text of dynamic document template 104 (text that may change from one version to another version of formatted document 108). Placeholder 204 may be positioned in-line with other text (e.g., static text 202). In addition to indicating dynamic text, placeholder 204 may indicate its binding characteristics. In an embodiment, placeholder 204 may be entered into template 104 in a similar manner as static text 202 (e.g., using text and a placeholder indicator, such as beginning and ending bracket symbols) and may be configured to automatically bind to an appropriate data source (e.g., a default data source indicated for template 104).

First expression 206 is associated with static text 202, and second expression 208 is associated with placeholder 204. First and second expressions 206 and 208 may each include any type of arithmetic and/or logical expression, which may include one or more data values obtained from a source external to dynamic document template 104. First expression 206 may be evaluated to select a display attribute for static text 202 in a particular formatted document 108. Second expression 208 may be evaluated to determine a value to be displayed for placeholder 204 in a particular formatted document 108, and/or to select a display attribute for a value displayed for placeholder 204 in a particular formatted document 108. Example display attributes include one or more of a font, a color, a bold setting, an italics setting, a font size, a line spacing, and/or an effects setting for displayed text in a formatted document 108.

In embodiments, more than one expression 206 may be associated with static text 202, and more than one expression 208 may be associated with a particular placeholder 204. For example, a first expression 206 may be configured to select a first display attribute (e.g., bold style) for static text 202, a second expression 206 may be configured to select a second display attribute (e.g., font size) for static text 202, a third expression 206 may be configured to select a third display attribute (e.g., color) for static text 202, etc. Likewise, with regard to placeholder 204, a first expression 208 may be configured to determine a value to be displayed in place of placeholder 204, a second expression 208 may be configured to select a first display attribute (e.g., font type) for the value displayed for placeholder 204, a third expression 208 may be configured to select a third display attribute (e.g., effects) for the value displayed for placeholder 204, etc. For ease of illustration, embodiments may be described below with regard to one expression associated with static text or a placeholder. However, it is to be understood that multiple expressions may also be associated with static text and placeholders.

System 100 of FIG. 1 may be implemented in various ways. For instance, document configurer 102 and document generator 106 may each be implemented in hardware, software, firmware, or any combination thereof. For example, document configurer 102 and/or document generator 106 may be implemented as computer program code configured to be executed in one or more processors. Alternatively, document configurer 102 and/or document generator 106 may be implemented as hardware logic/electrical circuitry.

Figure 3:
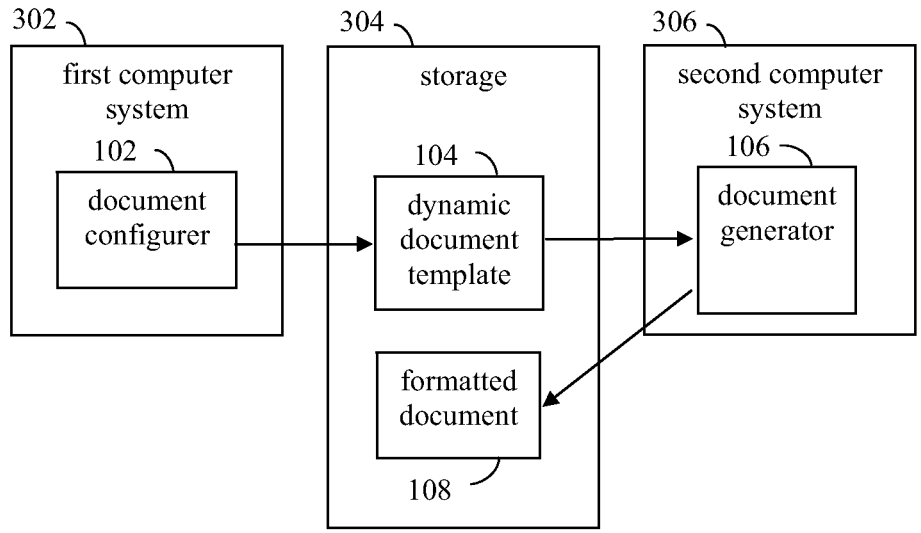
FIG. 3 shows a block diagram of a report generating system, according to an example embodiment.

For example, FIG. 3 shows a block diagram of a report generating system 300, according to an example embodiment. System 300 is an example of system 100 shown in FIG. 1. As shown in FIG. 3, system 300 includes a first computer system 302, a storage 304, and a second computer system 306. In the example of FIG. 3, first computer system 102 includes (e.g., stores in memory or other storage, and/or executes) document configurer 102, and second computer system 306 includes (e.g., stores in memory or other storage, and/or executes) document generator 106. Document configurer 102 generates dynamic document template 104, which is stored in storage 304 by first computer system 304. Document generator 106 retrieves dynamic document template 104 from storage 304, and generates one or more formatted documents 108, which are stored by second computer system 306 in storage 304.

The embodiment of FIG. 3 is provided for illustrative purposes, and is not intended to be limiting. For instance, in another embodiment, document configurer 102 and document generator 106 may be included in a same computer system. Furthermore, formatted document 108 may be stored in separate storage from dynamic document template 104. First and second computer systems 302 and 306 may each be any type of computer system, such as a stationary or mobile computing device, including a desktop computer (e.g., a personal computer), a mobile computer (e.g., a personal digital assistant (PDA), a laptop computer, a notebook computer, a smart phone, etc.), or other type of computing device. Storage 304 may include one or more storage devices, including one or more memory devices, hard disk drives, portable storage devices (e.g., USB memory sticks), optical storage devices, etc.

The next subsection describes example embodiments for document configurer 102, followed by a subsection that describes example embodiments for document generator 106.

A. Example Embodiments for Configuring a Dynamic Document

Example embodiments are described in this subsection for document configurer 102 and for configuring dynamic documents. The example embodiments described herein are provided for illustrative purposes, and are not limiting. Furthermore, additional structural and operational embodiments, including modifications/alterations, will become apparent to persons skilled in the relevant art(s) from the teachings herein.

Figure 4:
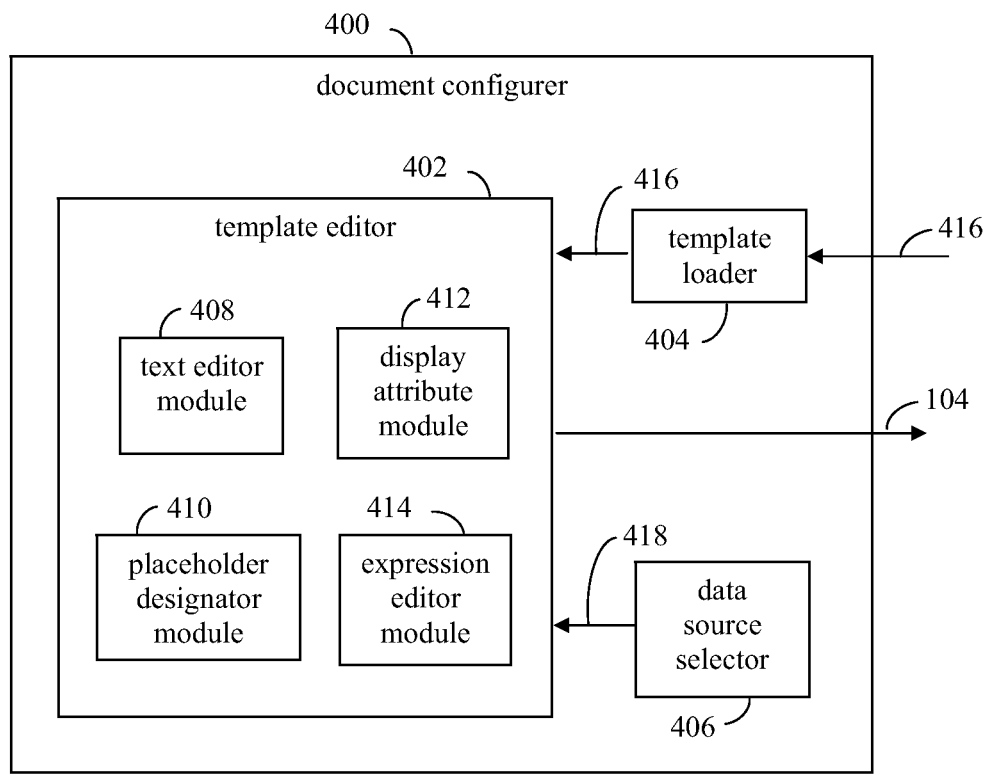
FIG. 4 shows a block diagram of a document configurer, according to an example embodiment.

Document configurer 102 may be configured in various ways to generate dynamic document template 104. For instance, FIG. 4 shows a block diagram of a document configurer 400, according to an example embodiment. Document configurer 400 is an example of document configurer 102 shown in FIGS. 1 and 3. As shown in FIG. 4, document configurer 400 includes a template editor 402, a template loader 404, and a data source selector 406. Document configurer 400 is described as follows.

Template loader 404 is optionally present. When present, template loader 404 is configured to load a previously generated (e.g., partially completed or fully completed) dynamic document template 104 into document configurer 400. For example, template loader 404 may provide a navigator interface that enables a user to enter a file name for a previously stored dynamic document template 416, and/or to navigate to a location at which previously stored dynamic document template 416 is stored, and to select the previously stored dynamic document template 416 at the location to be loaded into document configurer 400. Template loader 404 is further configured to provide the loaded, previously stored dynamic document template 416 to template editor 402 for editing.

Template editor 402 is configured to generate dynamic document template 104 anew (e.g., from no previous template file) or from a loaded dynamic document template (e.g., previously stored dynamic document 416). As shown in FIG. 4, template editor 402 includes a text editor module 408, a placeholder designator module 410, a display attribute module 412, and an expression editor module 414. Text editor module 408 is configured to enable text (e.g., static text) to be edited (e.g., added, deleted, modified) by a user in dynamic document template 104. Placeholder designator module 410 is configured to designate one or more placeholders (e.g., dynamic text) in dynamic document template 104. For example, in an embodiment, placeholder designator module 410 may be configured to enable a user to enter one or more placeholders in dynamic document template 104. In another embodiment, placeholder designator module 410 may be configured to enable a user to select and convert text previously entered using text editor module 408 into a placeholder. Display attribute module 412 is configured to enable display attributes of static text and/or dynamic text to be configured in dynamic document template 104 by a user. Expression editor module 414 is configured to enable a user to configure one or more expressions in dynamic document template 104 that are associated with static text and/or dynamic text.

Data source selector 406 is configured to enable a user to select a data source to be associated with dynamic document template 104. The data source may be accessed to provide data that may be used to fill placeholders and/or may be used by expressions in dynamic document template 104. As shown in FIG. 4, data source selector 406 provides a data source indication 418 which indicates a data source selected to be associated with dynamic document template 104.

Figure 5:
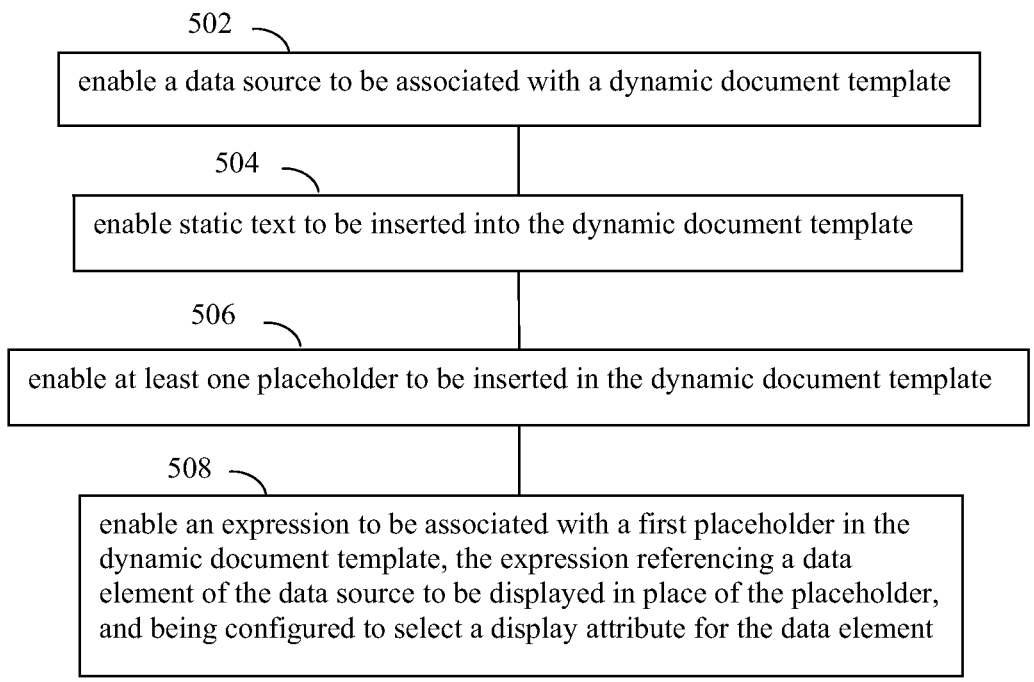
FIG. 5 shows a flowchart describing a process for configuring a dynamic document, according to an example embodiment.

Document configurer 400 may operate in various ways. For example, FIG. 5 shows a flowchart 500 describing a process for configuring a dynamic document, according to an example embodiment. For instance, document configurers 102 and 400 may perform flowchart 500, in embodiments. Other structural and operational embodiments will be apparent to persons skilled in the relevant art(s) based on the discussion regarding flowchart 500. Flowchart 500 is described as follows.

As shown in FIG. 5, flowchart 500 begins with step 502. In step 502, a data source is enabled to be associated with a dynamic document template. For example, referring to FIG. 4, data source selector 406 may be configured to enable a data source to be associated with dynamic document template 104. In an embodiment, data source selector 406 may provide an interface that enables a user to enter or navigate to a data source name or location (e.g., a directory path and file name, a URI (uniform resource indicator), etc.). As shown in FIG. 4, data source selector 406 provides data source indication 418 which indicates a data source selected to be associated with dynamic document template 104.

In step 504, static text is enabled to be inserted into the dynamic document template. For example, referring to FIG. 4, text editor module 408 may be configured to enable a user to insert static text (e.g., static text 202 of FIG. 2) in dynamic document template 104. For example, text editor module 408 may enable the user to input static text into dynamic document template 104 in various ways, including manually typing in static text, inputting static text using speech recognition, and/or by other technique. For instance, in an embodiment, template editor 402 may provide a user interface, such as a graphical user interface (GUI), to enable a user to input static text into dynamic document template 104.

In step 506, at least one placeholder is enabled to be inserted in the dynamic document template. For example, referring to FIG. 4, placeholder designator module 410 may be configured to enable a user to insert one or more placeholders (e.g., one or more of placeholder 204 of FIG. 2) in dynamic document template 104. For example, placeholder designator module 410 may enable the user to insert a placeholder into dynamic document template 104 in various ways, including by manually typing in placeholder label, and indicating the label as a placeholder, such as by surrounding the text with brackets or other suitable character(s), by using a pointing device to highlight the text and to cause a menu to appear (e.g., by right clicking on the highlighted text) that has a placeholder indication that can be applied to the highlighted text, and/or by further technique. For instance, in an embodiment, placeholder designator module 410 may provide a user interface, such as a graphical user interface (GUI), to enable a user to insert a placeholder into dynamic document template 104.

For instance, the following two lines of text are an example of a portion of text inserted into a dynamic document template 104 that may be generated by a user using document configurer 400:

Dear [Customer],
The amount due is: [AmountDue]

The text portions "Dear" and "The amount due is:" are two example portions of static text 202 that may be enabled (according to step 504) to be inserted into the example dynamic document template 104. Thus, the text portions "Dear" and "The amount due is:" are configured to be present in each formatted document 208 generated from the example dynamic document template 104. The text portions [Customer] and [AmountDue] are two example placeholders 204 that may be enabled (according to step 506) to be inserted into of the example dynamic document template 104, as indicated by opening and closing brackets. The text portions [Customer] and [AmountDue] are configured to be variable (dynamic) in each formatted document 208 generated from the example dynamic document template 104. With regard to the first placeholder of "[Customer]", the text "Customer" is a label for the placeholder, and the opening and closing brackets "[" and "]" define the beginning and the end boundaries, respectively, of the first placeholder.

In step 508, an expression is enabled to be associated with the placeholder in the dynamic document template, the expression referencing a data element of the data source to be displayed in place of the placeholder, and being configured to select a display attribute for the data element. For example, referring to FIG. 4, expression editor module 414 may be configured to enable a user to input and associate an expression with a placeholder (e.g., associating expression 208 with placeholder 204 in FIG. 2) in dynamic document template 104. For example, expression editor module 414 may enable the user to insert an expression into dynamic document template 104 in various ways, including manually typing in the expression (e.g., in equation form), etc. Furthermore, expression editor module 414 may enable the expression to be associated with a placeholder in various ways. For example, in an embodiment, a user may be enabled to use a pointing device to click on a placeholder in dynamic document template 104 to cause a menu to appear that includes an expression editor selection (which, if selected, opens an expression editor window), and/or by further technique. For instance, in an embodiment, expression editor module 414 may provide a user interface, such as a graphical user interface (GUI), to enable a user to input an expression into dynamic document template 104, and to associate the expression with a placeholder.

As shown in FIG. 4, template editor 412 may include display attribute module 412. Display attribute module 412 may be present to enable display attributes to be applied to static text and/or placeholders in dynamic document template 104. Examples of such display attributes that may be applied by display attribute module 412 include a font, a color, a bold setting, an italics setting, a font size, a line spacing, and/or an effects setting (e.g., blinking text, animations, etc.). Display attribute module 412 may enable display attributes to be applied to static text and placeholders in various ways. For example, in an embodiment, a user may be enabled to use a pointing device to click on static text or a placeholder in dynamic document template 104 to cause a menu to appear that has a static text or placeholder attributes/properties selection (which, if selected, opens a corresponding display attributes window), and/or by further technique. For instance, in an embodiment, display attribute module 412 may provide a user interface, such as a graphical user interface (GUI), to enable a user to apply display attributes to static text and/or placeholders in dynamic document template 104.

Figure 6:
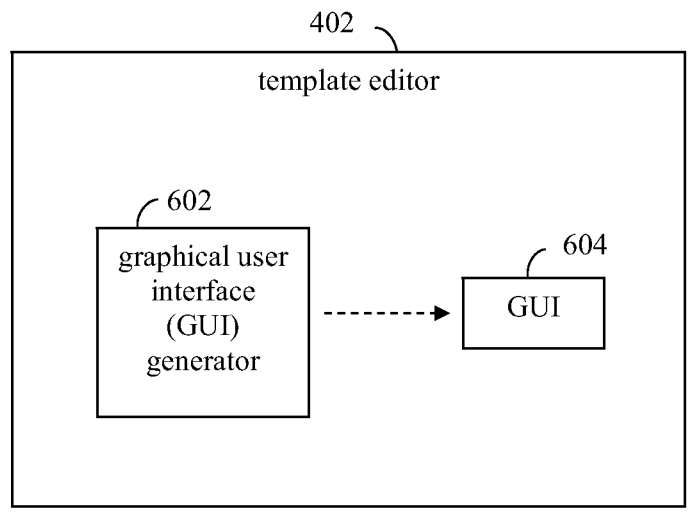
FIG. 6 shows a block diagram of a template editor, according to an example embodiment.

For instance, FIG. 6 shows a block diagram of template editor 402, according to an example embodiment. As shown in FIG. 6, template editor 402 may include a graphical user interface (GUI) generator 602 that is configured to generate a GUI 604, which may also be referred to as a "dialog," to enable easy, fluid ways of configuring a template, including declaring dynamic text (placeholders) and expressions. GUI generator 602 may be configured to generate GUI 604 ("dialogs") for any one or more of text editor module 408, placeholder designator module 410, display attribute module 412, and expression editor module 414.

Figure 7:
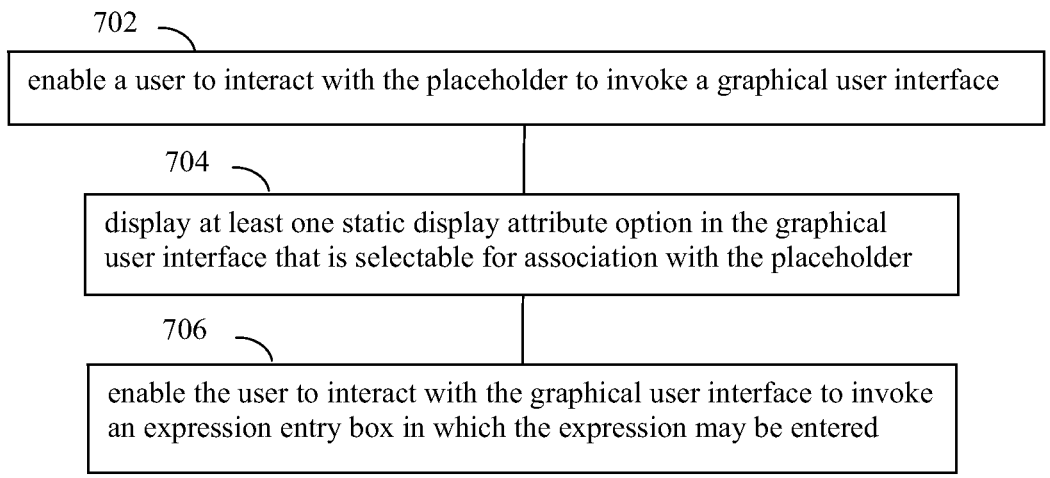
FIG. 7 shows a flowchart that may be performed to use a graphical user interface (GUI) to associate an expression with a placeholder in a dynamic document, according to an example embodiment.

For instance, FIG. 7 shows a flowchart 700 that may be performed with respect to step 508 of flowchart 500 to use a GUI to associate an expression with a placeholder in dynamic document template 104, according to an example embodiment. Flowchart 700 is described as follows.

Figure 8:
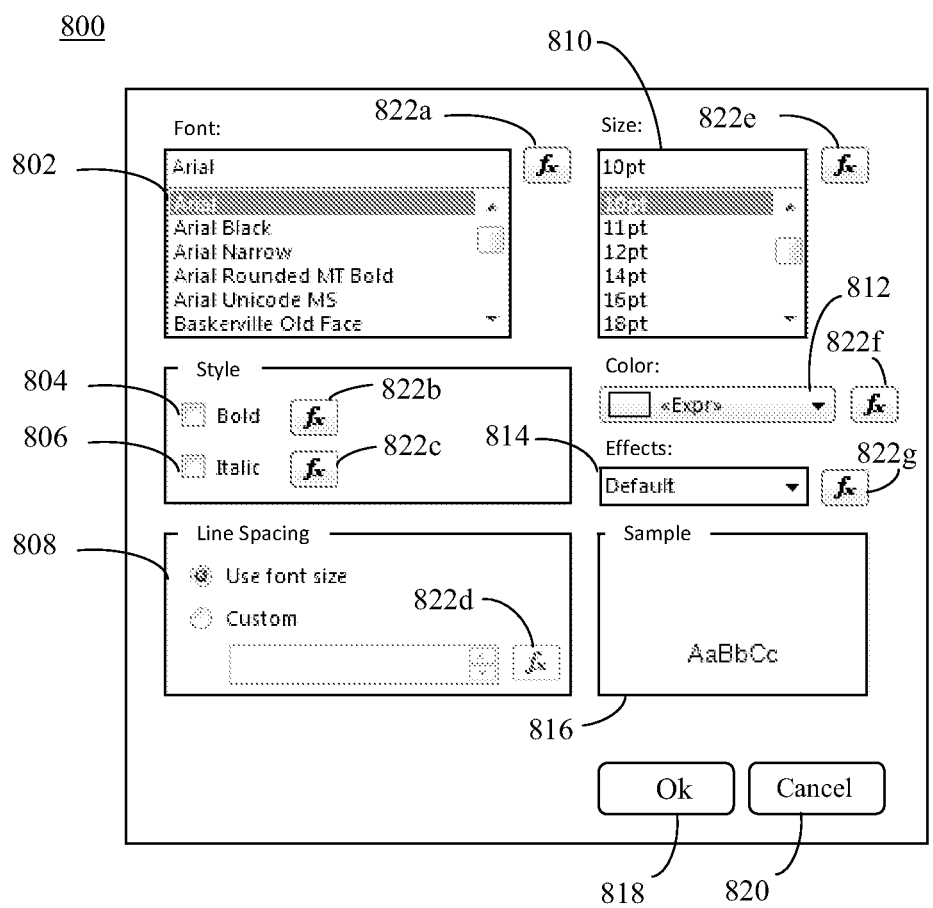
FIG. 8 shows a GUI window for configuring display attributes for text in a dynamic document, according to an example embodiment.

As shown in FIG. 7, flowchart 700 begins with step 702. In step 702, a user is enabled to interact with the placeholder to invoke a graphical user interface. For example, a user may be enabled to use a pointing device to click on a placeholder in dynamic document template 104 to cause a graphical user interface (GUI) to appear (which, if selected, opens an expression editor window), and/or by further technique. For instance, FIG. 8 shows a GUI window 800, according to an example embodiment. GUI window 800 may be invoked (e.g., generated by GUI generator 602 in FIG. 6) by interacting with a placeholder in dynamic document template 104.

In step 704, at least one static display attribute option is displayed in the graphical user interface that is selectable for association with the placeholder. For example, GUI window 800 may provide various static display attributes that may be selected for text (static text or placeholders) in dynamic document template 104, such that when the text is displayed in formatted document 108, the text has the selected display attributes. For example, as shown in FIG. 8, GUI window 800 includes a font type selector 802, a bold style selector 804, an italics style selector 806, a line spacing selector 808, a font size selector 810, a color selector 812, and an effects selector 814. Any one or more of these selectors and/or alternative display attribute selectors may be present in GUI window 800. Furthermore, GUI window 800 includes a sample region 816, which shows a sample of the display attributes that are currently selected on example text ("AaBbCb").

Font type selector 802 enables a user to select a font for the selected text. As shown in FIG. 8, font type selector 802 may be a list of selectable fonts, but may alternatively have other graphical interface form. Bold style selector 804 enables a user to select whether the selected text is bolded. As shown in FIG. 8, bold style selector 804 may be a check box, but may alternatively have other graphical interface form. Italics style selector 806 enables a user to select whether selected text is italicized. As shown in FIG. 8, italics style selector 806 may be a check box, but may alternatively have other graphical interface form. Line spacing selector 808 enables a user to select a line spacing for the selected text. As shown in FIG. 8, line spacing selector 808 may be a radio button (with a custom selection entry box), but may alternatively have other graphical interface form. Font size selector 810 enables a user to select a font size for the selected text. As shown in FIG. 8, font size selector 810 may be a list of selectable font sizes, but may alternatively have other graphical interface form. Color selector 812 enables a user to select a color for the selected text. As shown in FIG. 8, color selector 812 may be a drop down menu of selectable colors, but may alternatively have other graphical interface form. Effects selector 814 enables a user to select a type of effects for the selected text. As shown in FIG. 8, effects selector 814 may be a drop down menu of selectable effects, but may alternatively have other graphical interface form.

In step 706, the user is enabled to interact with the graphical user interface to invoke an expression entry box in which the expression may be entered. In embodiments, the GUI window invoked in step 702 may provide various ways for enabling a user to invoke an expression entry box into which an expression associated with the placeholder may be entered. For example, as shown in FIG. 8, GUI window 800 includes a plurality of expression entry buttons 822a-822g, with each expression entry button 822 corresponding to one of font type selector 802, bold style selector 804, italics style selector 806, line spacing selector 808, font size selector 810, color selector 812, and effects selector 814. Each of expression entry buttons 822a-822g may be selected to enable an expression to be entered with respect to the corresponding one of font type selector 802, bold style selector 804, italics style selector 806, line spacing selector 808, font size selector 810, color selector 812, and effects selector 814.

For example, if expression entry button 822a is selected, an expression may be provided (textually, graphically, etc.) by the user that is configured to select a font type for the placeholder indicated in step 702. If expression entry button 822b is selected, an expression may be provided by the user that is configured to select a bold style for the placeholder indicated in step 702. If expression entry button 822c is selected, an expression may be provided by the user that is configured to select an italics style for the placeholder indicated in step 702. If expression entry button 822d is selected, an expression may be provided by the user that is configured to select line spacing for the placeholder indicated in step 702. If expression entry button 822e is selected, an expression may be provided by the user that is configured to select a font size for the placeholder indicated in step 702. If expression entry button 822f is selected, an expression may be provided by the user that is configured to select a color for the placeholder indicated in step 702. If expression entry button 822g is selected, an expression may be provided by the user that is configured to select an effects style for the placeholder indicated in step 702.

Figure 9:
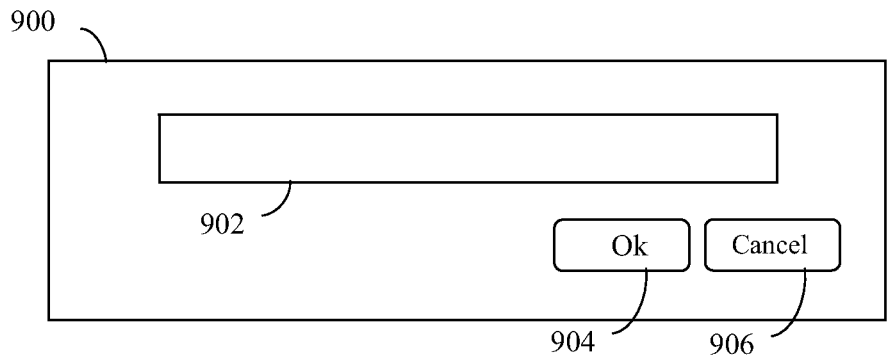
FIG. 9 shows an expression entry window, according to an example embodiment.

FIG. 9 shows an example expression entry window 900 that may be invoked by selecting an expression entry button 822, according to an embodiment. As shown in FIG. 9, window 900 includes an expression entry box 902, a confirm button 904, and a cancel button 906. In the example of FIG. 9, a user may enter an expression (e.g., expression 206 or 208 of FIG. 2) into expression entry box 902. An expression entered into expression entry box 902 may be configured such that when the expression is evaluated, a display attribute is selected for the text that is displayed in place of the placeholder indicated in step 702. The expression is configured to select a display attribute associated with the particular expression entry button 822 that is selected. For example, referring to FIG. 8, if expression entry button 822c is selected, which corresponds to italics style selector 806, the resulting expression entry window 900 that is invoked enables a user to enter an expression into expression entry box 902 that is configured to select an italics style (e.g., italics on or off). If expression entry button 822e is selected, which corresponds to font size selector 810, the resulting expression entry window 900 that is invoked enables a user to enter an expression into expression entry box 902 that is configured to select a font size (e.g., 10 pt font, 11 pt font, etc.).

After entering an expression into expression entry box 902, the user may select confirm button 904 ("Ok") to enter the expression into dynamic document template 104 in association with the placeholder. Alternatively, the user may select cancel button 906 to not enter the expression in dynamic document template 104. Furthermore, when the user is finished configuring display attributes in GUI window 800, the user may select a confirm button 818 ("Ok") or a cancel button 820.

An expression may be entered into expression entry box 902 in any form, including any combination of textual, Boolean, logical, and/or arithmetic operation. For example, the expression may be entered in a programming language form, including in the form of JAVASCRIPT®, VISUAL BASIC®, C#, further Microsoft® .NET supported languages, etc. Furthermore, the expression may include any number of data elements as variables, the values of which may be retrieved from a data source external to dynamic document template 104.

For instance, with respect to the example "[AmountDue]" placeholder shown above, the following example expression (shown in VISUAL BASIC® form, for purposes of illustration) may be entered into expression entry box 902 for an expression entry window 900 invoked by selecting expression entry button 822f (corresponding to color selector 812):

=IIF(Fields!AmountDue.Value>=500, "Red", "Green")

With respect to this example expression, the "Fields!AmountDue.Value" parameter is a dynamic component, indicating that a value for "AmountDue.Value" is retrieved from an external data source (e.g., a database) associated with dynamic document template 104 as described above. When generating a formatted document that includes this expression, a value for "AmountDue.Value" is retrieved, and if the retrieved value is greater than or equal to 500, the color "Red" is selected. If the retrieved value is less than 500, the color "Green" is selected. The selected color is applied to the retrieved value, which is displayed in place of the placeholder "[AmountDue]" in the formatted document.

The expression shown above is provided for purposes of illustration, and as described above, any form of expression may be provided to select any display attribute for a placeholder.

Figure 10:
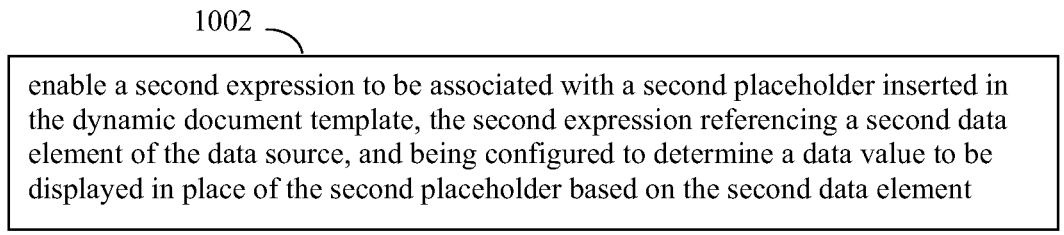
FIG. 10 shows a process for associating an expression with a placeholder that is configured to determine a data value to be displayed in place of the placeholder, according to an example embodiment.

Expressions may also be associated with a placeholder to determine a data value to be displayed in place of the placeholder in a formatted document. For example, in an embodiment, flowchart 500 of FIG. 5 may include a step 1002 shown in FIG. 10 (in addition to, or alternatively to step 508). In step 1002, a second expression is enabled to be associated with a second placeholder inserted in the dynamic document template, the second expression referencing a second data element of the data source, and being configured to determine a data value to be displayed in place of the second placeholder based on the second data element. For example, in a similar manner as described above with respect to FIG. 4 and step 508 of flowchart 500, expression editor module 414 may be configured to enable a user to input and associate an expression with a placeholder in dynamic document template 104 that is configured to determine a data value to be displayed in place of the placeholder in a formatted document.

For example, expression entry window 900 (FIG. 9) may be invoked by selecting an expression entry button 822 (FIG. 8) in window 800 for a particular placeholder in dynamic document template 104. An expression may be entered by a user in expression entry box 902 that is configured to determine a data value to be displayed in place of the placeholder. An example of such an expression is shown below, which may be associated with the [AmountDue] placeholder shown above:

=(Fields!AmountDue.Value−100)

With respect to this example expression, the "Fields!AmountDue.Value" parameter is a data element providing a dynamic component to the expression, indicating that a value for "AmountDue.Value" is retrieved from an external data source (e.g., a database), which is associated with dynamic document template 104 by data source selector 406 (FIG. 4), as described above. When generating a formatted document that includes this expression, a value for "AmountDue.Value" is retrieved. The amount "100" is subtracted from the value for "AmountDue.Value", and the resulting amount is displayed in place of the [AmountDue] placeholder in the formatted document. In this manner, the expression is configured to determine a data value to be displayed by performing an operation that includes the "AmountDue.Value" as a variable parameter. Although shown above as including a subtraction arithmetic operation, the expression may have any in any form, including any combination of textual, Boolean, logical, and/or arithmetic operation.

Figure 11:
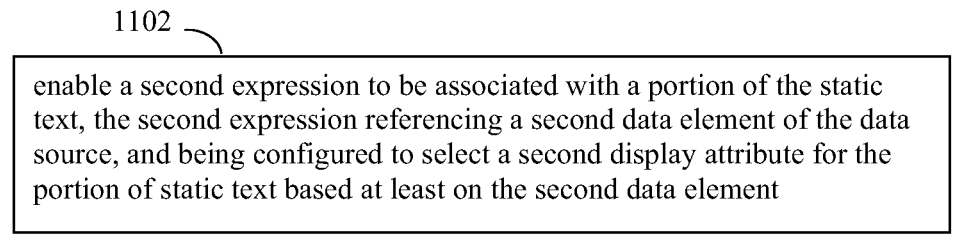
FIG. 11 shows a process for associating an expression with static text that is configured to select a display attribute for the static text, according to an example embodiment.

Expressions may also be associated with static text to select display attributes for static text displayed in a formatted document, such as is shown in FIG. 2, where expression 206 is associated with static text 202. For example, in an embodiment, flowchart 500 of FIG. 5 may include a step 1102 shown in FIG. 11 (in addition to, or alternatively to steps 508 and/or 1002). In step 1102, a second expression is enabled to be associated with a portion of the static text, the second expression referencing a second data element of the data source, and being configured to select a second display attribute for the portion of static text based at least on the second data element. For example, in a similar manner as described above with respect to FIG. 4 and step 508 of flowchart 500, expression editor module 414 may be configured to enable a user to input and associate an expression with a static text in dynamic document template 104 that is configured to determine a display attribute for the static text to be displayed in a formatted document.

For example, static text in dynamic document template 104 may be selected by a user (e.g., highlighted using a shift-cursor operation or pointing device), to cause a menu to appear that has a static text attributes/properties selection. By selecting the static text attributes/properties selection, a GUI, such as GUI window 800 (FIG. 8) may be displayed for the selected static text, to enable display attributes to be selected for the selected static text. A display attribute expression entry window 900 (FIG. 9) may be invoked by selecting an expression entry button 822 (FIG. 8) in window 800. An expression may be entered by a user in expression entry box 902 that is configured to determine a display attribute for the selected static text. An example of such an expression is shown below, which may be associated with the "The amount due is:" static text shown above:

=IIF(Fields!AmountDue.Value>=500, "Red", "Green")

With respect to this example expression, the "Fields!AmountDue.Value" parameter is a data element providing a dynamic component to the expression, indicating that a value for "AmountDue.Value" is retrieved from an external data source, which is associated with dynamic document template 104 as described above. When generating a formatted document that includes this expression, a value for "AmountDue.Value" is retrieved, and if the retrieved value is greater than or equal to 500, the color "Red" is selected. If the retrieved value is less than 500, the color "Green" is selected. The selected color is applied to the selected static text "The amount due is:" when displayed the formatted document. In this manner, an expression may be configured to determine a display attribute for static text based on one or more data elements as variable parameters.

A single data element is described as included in the example expressions provided above. In further embodiments, multiple data elements may be included in an expression associated with a placeholder or with static text. An example of such an expression is shown below, which may be associated with the [Customer] placeholder shown above:

=Fields!FirstName.Value+Fields!LastName.Value

With respect to this example expression, the "Fields!FirstName.Value" and "Fields!LastName.Value" parameters are data elements providing dynamic components to the expression. When generating a formatted document that includes this expression, values for "FirstName.Value" and "LastName.Value" are retrieved from an external data source. The retrieved values are concatenated together according to the expression, and displayed in place of the [Customer] placeholder in the formatted document (e.g., to provide first and second names of a customer). Although two data elements are illustrated in this example, in a similar manner, third, fourth, and further numbers of data elements may be included in expressions to determine data values and/or to select display attributes.

As shown in FIG. 4, template editor 402 generates dynamic document template 104. Template editor 402 may be configured to generate dynamic document template 104 in any suitable form. For example, dynamic document template 104 may be generated as one or more files or other data structures that include data source indication 418, static text 202, one or more placeholders 204, one or more of expressions 206 and/or expressions 208. For instance, dynamic document template 104 may be generated in a conventional word processing document format, according to a programming code or specification, or in other form. One example of a portion of the contents of a dynamic document 104 is shown as follows, in XML (extensible markup language) form:

```
<Paragraph>
    <TextRuns>
        <TextRun>
            <Value>Dear </Value>
            <Style />
        </TextRun>
        <TextRun>
            <Value>Fields!Customer.Value</Value>
            <Style />
        </TextRun>
```
-continued
```
        <TextRun>
            <Value>,</Value>
            <Style />
        </TextRun>
    </TextRuns>
    <Style />
</Paragraph>
<Paragraph>
    <TextRuns>
        <TextRun>
            <Value>The amount due is: </Value>
            <Style />
        </TextRun>
        <TextRun>
            <Value>Fields!AmountDue.Value</Value>
            <Style>
                <Format>'$0.00; ('$'0.00)</Format>
                <Color>=IIF(Fields!AmountDue.Value >= 500,
                "Red", "Green"),/Color>
            <Style />
        </TextRun>
    </TextRuns>
    <Style />
</Paragraph>
```

A declarative language, such as XML, which may be format independent, provides an efficient structure for defining the contents of dynamic document template 104. For instance, XML may provide a structure for expressing blocks of paragraphs and flows of text, as shown above, which can each include static and dynamic pieces.

In the above example XML code, the element pair "<Paragraph>" and "</Paragraph>" (a "Paragraph pair") delineates the boundaries of a paragraph generated from dynamic document template 104. Thus, two paragraphs of text are provided by this example XML code. The element pair "<TextRuns>" and "</TextRuns>" (a "TextRuns" pair) delineates the boundaries of a contiguous series of strings of similarly formatted text generated from dynamic document template 104 (within a paragraph). Each string of text is delineated by the element pair "<TextRun>" and "</TextRun>" (a "TextRun pair"). Each TextRuns pair may be evaluated individually, and rendering clients can achieve rich text output simply by concatenating the values of all TextRuns.

The element pair "<Value>" and "</Value>" (a "Value pair") delineates the boundaries of a string of static text and/or a placeholder generated from dynamic document template 104. For instance, in the example described further above, the text "The amount due is:" is static text, and is shown in the XML code above contained within a Value pair. The element pair "<Style>" and "</Style>" (a "Style pair") contained in a TextRun pair delineates the boundaries of a particular display style (e.g., display attribute) setting for text contained within the Style pair. A default display style for a TextRun pair may be indicated by including "<Style/>" within the TextRun pair. The element pair "<Format>" and "</Format>" (a "Format pair") delineates the boundaries of a display format for a placeholder generated from dynamic document template 104.

For example, a Value pair in the above XML code (that is contained within a TestRun pair) contains "Fields!AmountDue.Value", which indicates a data element is to be retrieved for the [Amount Due] placeholder. A Format pair in the above XML code in the same TestRun pair contains the text "'$0.00; ('$'0.00)", which indicates that the retrieved data element is to be displayed for the [AmountDue] placeholder in dollar format in a generated formatted document.

The element pair "<Color>" and "</Color>" (a "Color pair") delineates the boundaries of expression used to select a color for static text or a placeholder generated from dynamic document template 104. For example, a Color pair in the above XML code includes the following expression "IIF (Fields!AmountDue.Value >=500, "Red", "Green")" (where ">" is equivalent to ">"), which was described above. This expression may be evaluated based on the value of the retrieved data element to select a color (e.g., red or green) for the data element displayed for the [AmountDue] placeholder.

The example element pairs shown and described above with respect to the example XML code are provided for illustrative purposes, and are not intended to be limiting. Persons skilled in the relevant art(s) will understand that alternative names may be used for the element pairs, and that additional types of element pairs may be present, such as additional element pairs used to delineate the boundaries of display attributes. Examples of such additional element pairs include a <FontType> </FontType> pair (providing a font type for contained static text/placeholders), a <BoldStyle> </BoldStyle> pair (providing a bold style for contained static text/placeholders), a <ItalicsStyle> </ItalicsStyle> pair (providing an italics style for contained static text/placeholders), a <LineSpacing> </LineSpacing> pair (providing a line spacing for contained static text/placeholders), a <FontSize> </FontSize> pair (providing a font size for contained static text/placeholders), an <Effects> </Effects> pair (providing an effects type for contained static text/placeholders), etc.

B. Example Embodiments for Configuring a Dynamic Document

Example embodiments are described in this subsection for document generator 106 and for generating formatted documents. The example embodiments described herein are provided for illustrative purposes, and are not limiting. Furthermore, additional structural and operational embodiments, including modifications/alterations, will become apparent to persons skilled in the relevant art(s) from the teachings herein.

Figure 12:
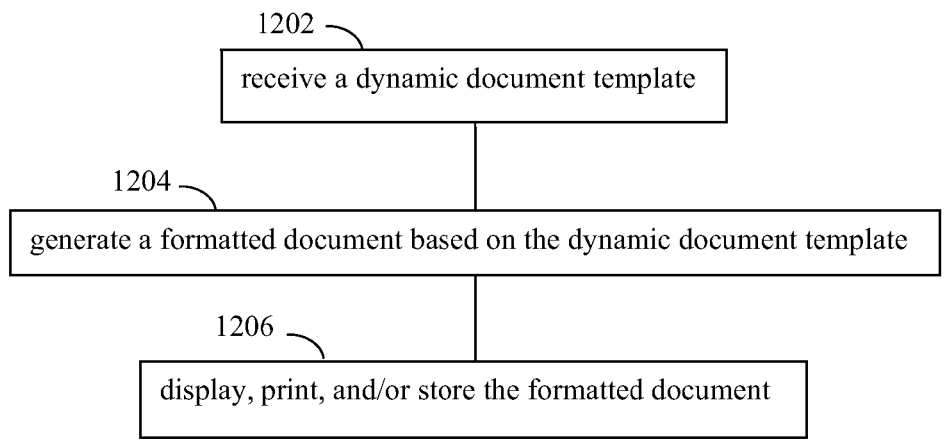
FIG. 12 shows a flowchart providing a process for generating formatted documents based on a dynamic document template, according to an example embodiment.

As described above, document generator 106 (FIG. 1) is configured to generate formatted documents 108 based on dynamic document template 104. For instance, in an embodiment, document generator 106 may perform flowchart 1200 shown in FIG. 12. As shown in FIG. 12, flowchart 1200 begins with step 1202. In step 1202, a dynamic document template is received. For example, as shown in FIG. 1, document generator 106 receives dynamic document template 104.

In step 1204, a formatted document is generated based on the dynamic document template. For example, as shown in FIG. 1, document generator 106 generates formatted documents 108a-108c. Any number of formatted documents 108 may be generated.

In step 1206, the formatted document is displayed, printed, and/or stored. For example, as shown in FIG. 3, document generator 106 stores formatted document 108 in storage 304. Additionally, or alternatively, formatted documents 108 may be printed, may be displayed, may be transmitted (e.g., emailed), or otherwise utilized.

Figure 13:
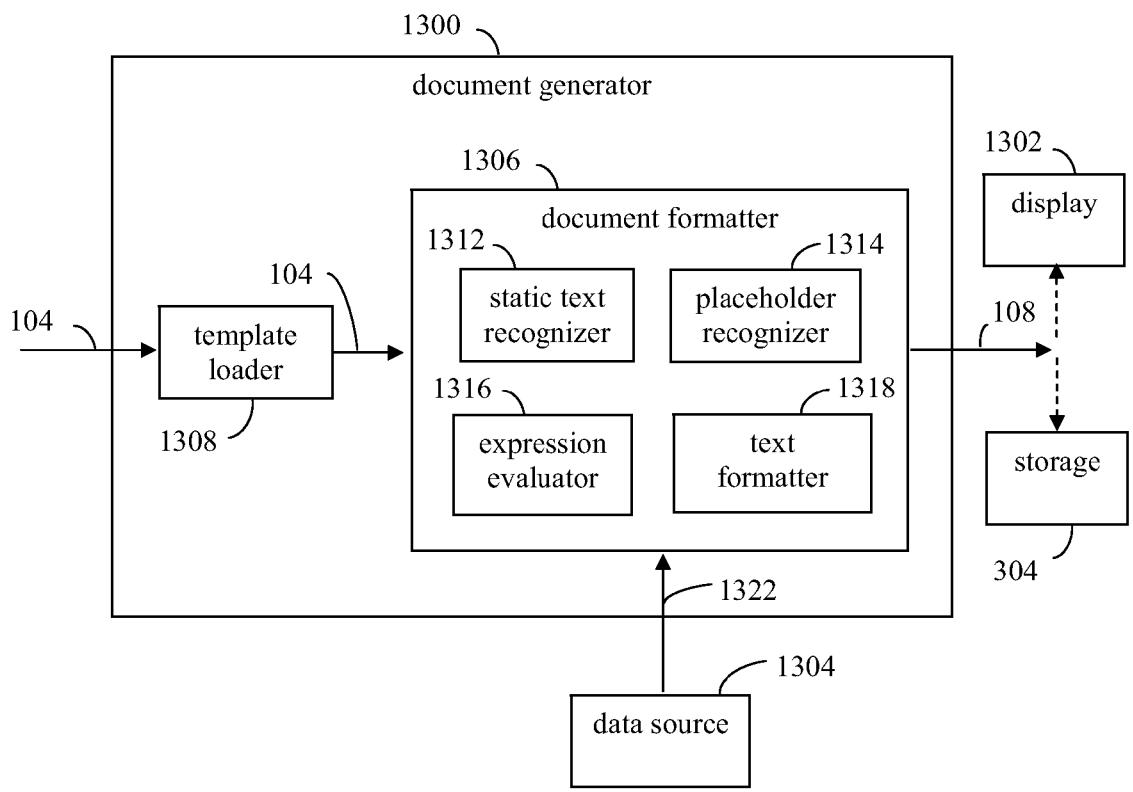
FIG. 13 shows a block diagram of a document generator, according to an example embodiment.

Document generator 106 may be configured in various ways to generate one or more formatted documents 108 based on dynamic document template 104. For instance, FIG. 13 shows a block diagram of a document generator 1300, according to an example embodiment. Document generator 1300 is an example of document generator 106 shown in FIGS. 1 and 3. As shown in FIG. 13, document generator 1300 includes a template loader 1308 and document formatter 1306. Document generator 1300 is further shown coupled to a display 1302, to storage 304, and to a data source 1304. Document generator 1300 is described as follows.

Template loader 1308, when present, is configured to load dynamic document template 104 into document generator 1300. For example, template loader 1308 may provide a navigator interface that enables a user to enter a file name for dynamic document template 104 (e.g., as stored in storage 304 in FIG. 3), and/or to navigate to a location at which dynamic document template 104 is stored, and to select dynamic document template 104 at the location, to be loaded into document generator 1300. Template loader 1308 is further configured to provide dynamic document template 104 to document formatter 1306 to generate one or more formatted documents 108.

Document formatter 1306 is configured to generate formatted documents 108 based on dynamic document template 104 and one or more data elements loaded from data source 1304. As shown in FIG. 13, document formatter 1306 includes a static text recognizer 1312, a placeholder recognizer 1314, an expression evaluator 1316, and a text formatter 1318. Static text recognizer 1312 is configured to detect static text (e.g., static text 202 of FIG. 2) in dynamic document template 104, which is included by document formatter 1306 in formatted document 108. Placeholder recognizer 1314 is configured to detect one or more placeholders (e.g., placeholder 204 of FIG. 2) in dynamic document template 104. Expression evaluator 1316 is configured to evaluate expressions (e.g., expressions 206 and 208 in FIG. 2) associated with static text and placeholders in dynamic document template 104. As shown in FIG. 13, when expression evaluator 1316 determines that an expression references a data element, document formatter 1306 is configured to transmit a data request to data source 1304 to retrieve the data element. In response, data source 1304 transmits a data element 1322, which is received by expression evaluator 1316 in document formatter 1306. In embodiments, expression evaluator 1316 may evaluate an expression that includes retrieved data element 1322. For example, the expression may be evaluated to select a display attribute for static text or for data inserted in place of a placeholder. Additionally, or alternatively, the expression may be evaluated to determine a data value to be inserted in place of a placeholder. Text formatter 1318 is configured to format the text (static text or data element) in formatted document 108 according to the selected display attribute and/or to provide the determined data value to be inserted in place of a placeholder.

Figure 14:
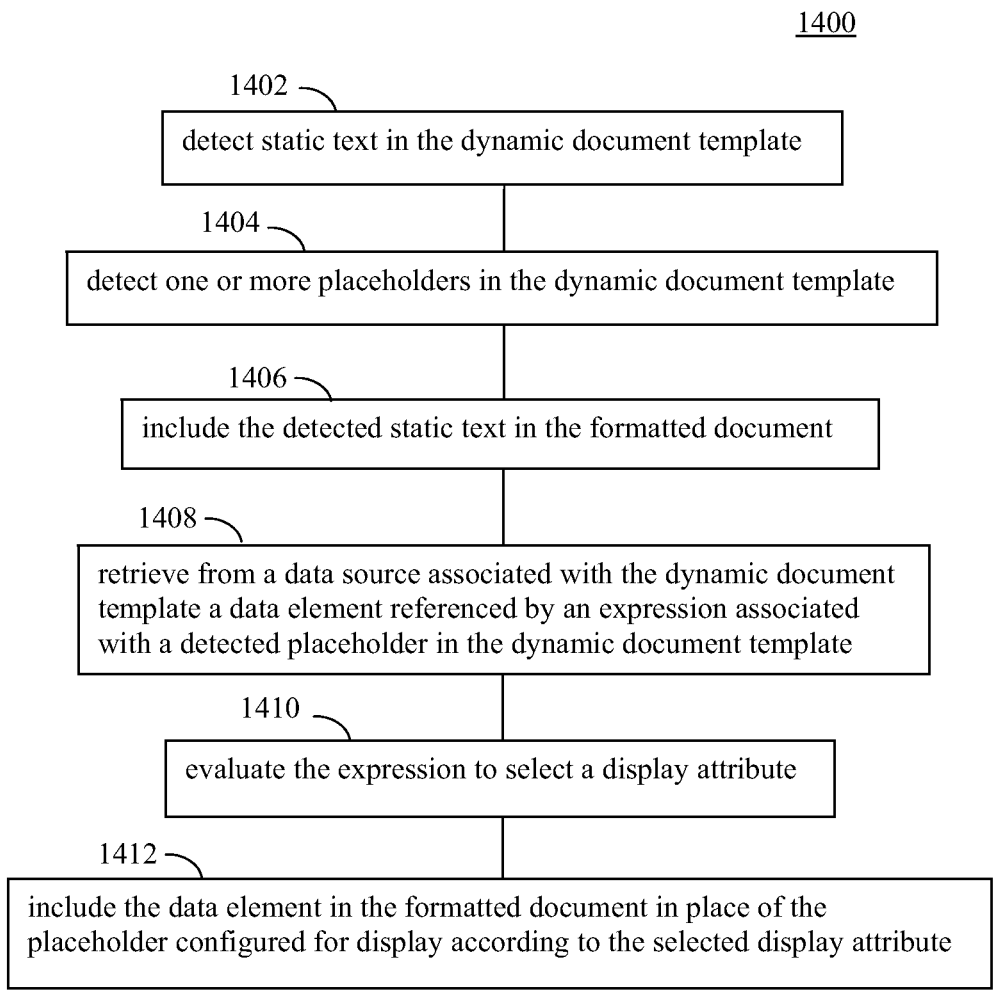
FIG. 14 shows a flowchart describing a process for generating documents, according to an example embodiment.

Document generator 1300 may operate in various ways. For example, FIG. 14 shows a flowchart 1400 describing a process for generating documents, according to an example embodiment. For instance, document generators 106 and 1300 may perform flowchart 1400, in embodiments. Other structural and operational embodiments will be apparent to persons skilled in the relevant art(s) based on the discussion regarding flowchart 1400. The steps of flowchart 1400 do not need to be performed in the order shown. Flowchart 1400 is described as follows.

As shown in FIG. 14, flowchart 1400 begins with step 1402. In step 1402, static text is detected in the dynamic document template. For example, as described above, static text recognizer 1312 may be configured to detect static text in dynamic document template 104. Static text recognizer 1312 may be configured to parse dynamic document template 104 to detect static text. For instance, referring to the XML code example for dynamic document template 104 shown in the prior subsection, static text recognizer 1312 may be configured to parse dynamic document template 104 for Value pairs (<Value> and </Value>) that contain static text (e.g., "Dear" and "The amount due is:" in the XML code shown above). Static text recognizer 1312 may be configured in any manner to detect static text in dynamic document template 104, according to the particular format used for static text.

In step 1404, one or more placeholders are detected in the dynamic document template. For example, as described above, placeholder recognizer 1314 may be configured to detect placeholders in dynamic document template 104. Placeholder recognizer 1314 may be configured to parse dynamic document template 104 to detect placeholders. For instance, referring to the XML code example for dynamic document template 104 shown in the prior subsection, placeholder recognizer 1314 may be configured to parse dynamic document template 104 for Value pairs (<Value> and </Value>) that contain a placeholder in the form of a "Fields!" code followed by a data element label, such as "Fields!Customer.Value", where "Customer.Value" is a data element corresponding to a [CustomerValue] placeholder. Placeholder recognizer 1314 may be configured in any manner to detect placeholders in dynamic document template 104, according to the particular format used for static text.

Figure 15:
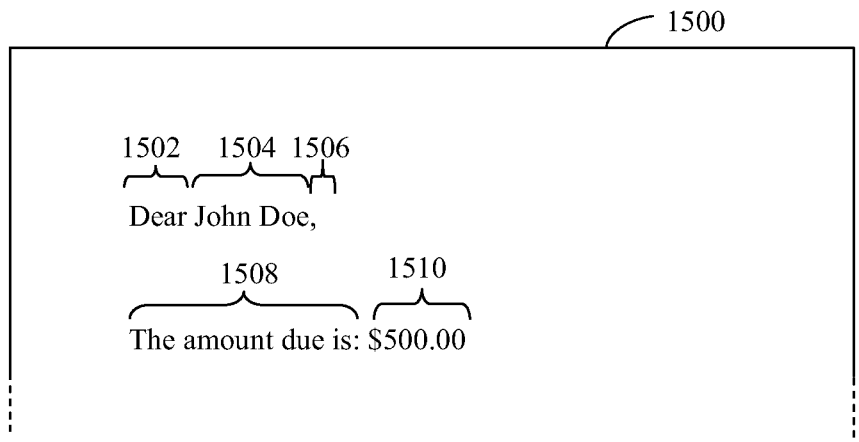
FIG. 15 shows a portion of an example formatted document, according to an embodiment.

In step 1406, the detected static text is included in the formatted document. For example, referring to FIG. 13, text formatter 1318 may be configured to include static text detected by static text recognizer 1312 in formatted document 108. For example, FIG. 15 shows a portion of a formatted document 1500, which is an example of formatted document 108, according to an embodiment. Formatted document 1500 may be generated by document generator 1300 shown in FIG. 13 from the example XML code shown in the prior subsection, for instance. As shown in FIG. 15, formatted document 1500 includes static text 1502 ("Dear"), static text 1506 (","), and static text 1508 ("The amount due is:"), which were each defined in the above example XML code in corresponding Value pairs.

In step 1408, a data element referenced by an expression associated with a detected placeholder in the dynamic document template is retrieved from a data source associated with the dynamic document template. For example, referring to FIG. 13, expression evaluator 1306 may be configured to detect a data element referenced by an expression associated with a placeholder detected by placeholder recognizer 1314. Document formatter 1306 may be configured to retrieve the detected data element from data source 1304 (e.g., by transmitting a data request) as data element 1322.

Figure 16:
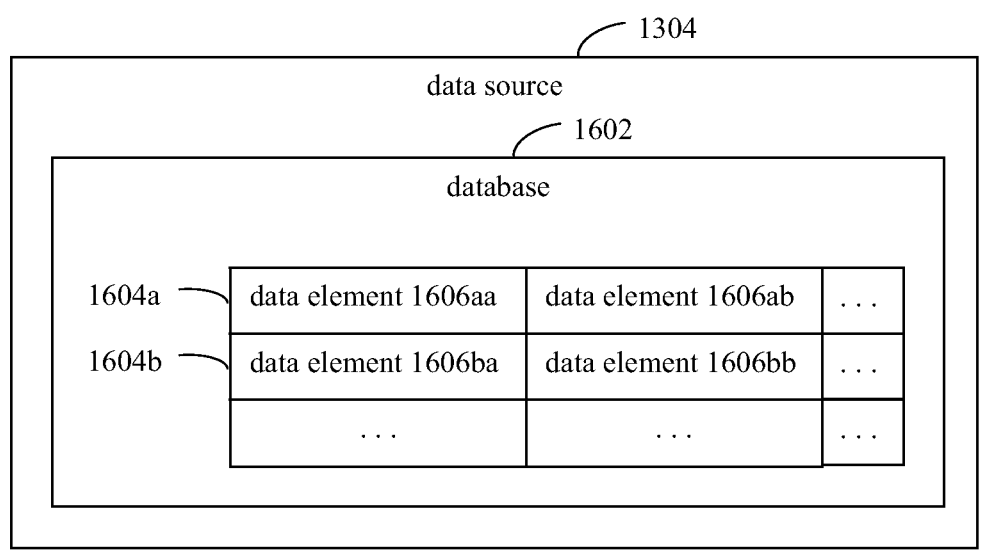
FIG. 16 shows a block diagram of a data source containing a database, according to an example embodiment.

Data source 1304 may be any source of data, including a database, a web service, or another source of data external to dynamic document template 104. In one embodiment, data source 1304 may be a database that contains a plurality of records, with each record corresponding to a particular version of formatted document 108 generated by document generator 1300. For instance, FIG. 16 shows a block diagram of a data source 1304 containing a database 1602, according to an example embodiment. As shown in the example of FIG. 16, database 1602 includes a plurality of records 1604 (e.g., a first record 1604*a* and a second record 1604*b*). Furthermore, each record 1604 includes a plurality of fields or data elements 1606. For instance, first record 1604*a* includes a first data element 1606*aa*, a second data element 1606*ab*, and may include further data elements 1606. Second record 1604*b* includes a first data element 1606*ba*, a second data element 1606*bb*, and may include further data elements 1606.

Dynamic document template 104 may include a plurality of placeholders 204 that each utilize one or more expressions, with each expression corresponding to one or more data elements 1606 included in a record 1604 of database 1602. In one example, each time document generator 1300 generates a formatted document 108 based on such a dynamic document template 104, a corresponding record 1604 of database 1602 may supply data elements 1606 to be used in expressions referenced by the template. For instance, record 1604*a* may supply data elements 1606 to generate formatted document 108*a*, record 1604*b* may supply data elements 1606 to generate formatted document 108*b*, etc.

In step 1410, the expression is evaluated to select a display attribute. For example, referring to FIG. 13, expression evaluator 1306 may be configured to evaluate the expression of step 1408 according to data element 1322 retrieved in step 1408. Note that steps 1408 and 1410 may be repeated for additional expressions associated with placeholders in template 104.

For instance, referring to the example XML code shown in the prior subsection, a data element 1322 value of "500" may be retrieved from data source 1304 with regard to the AmountDue.Value parameter associated with the [AmountDue] placeholder. In this example, expression evaluator 1306 evaluates the expression IIF(Fields!AmountDue.Value>=500, "Red", "Green") for AmountDue.Value=500. Because the retrieved value of 500 (AmountDue.Value) is equal to 500, expression evaluator 1306 selects "Red" as the color display attribute.

In step 1412, the data element is included in the formatted document in place of the placeholder configured for display according to the selected display attribute. For example, referring to FIG. 13, text formatter 1318 may include the data element retrieved in step 1408 in formatted document 108 in place of the placeholder. Furthermore, text formatter 1318 formats the data element in formatted document 108 according to the selected display attribute.

For instance, in the current example with regard to the XML code shown in the prior subsection, a data element 1322 value of "500" may be retrieved in step 1408, and the color display attribute of "Red" may be selected in step 1410. As such, the value 500 may be displayed in formatted document 1500 in FIG. 15 as placeholder replacement text 1510 (for the [AmountDue] placeholder) in the color red.

Note that steps 1408, 1410, and 1412 may be varied to accommodate determining data values to be displayed in place of a placeholder, and determining a display attribute to be applied to static text in a formatted document. For instance, FIG. 17 shows a flowchart 1700 providing a process for determining data values to be displayed in place of a placeholder, according to an example embodiment. Flowchart 1700 may be performed in addition to flowchart 1400, or in place of steps 1408, 1410, and 1412. Furthermore, flowchart 1700 may be repeated for any number of expressions associated with placeholders in template 104. Flowchart 1700 is described as follows.

As shown in FIG. 17, flowchart 1700 starts at step 1702. In step 1702, a second data element referenced by a second expression associated with a detected second placeholder in the dynamic document template is retrieved. Similarly to step 1408 described above, expression evaluator 1306 (FIG. 13) may be configured to detect a data element referenced by an expression associated with a placeholder detected by placeholder recognizer 1314. Document formatter 1306 may be configured to retrieve the detected data element from data source 1304 as data element 1322.

In step 1704, the second expression is evaluated to determine a data value. For example, referring to FIG. 13, expression evaluator 1306 may be configured to evaluate the expression according to data element 1322 retrieved in step 1702. As described above in the prior subsection, the expression may be any logical, Boolean, and/or arithmetic operation that includes the retrieved data element 1322.

For instance, the expression may be "Fields!AmountDue.Value−100" for the [AmountDue] placeholder. If the data element retrieved in step 1702 for "AmountDue.Value"

has a value of 500, the expression may be evaluated by expression evaluator 1306 as 500−100=400.

In step 1706, the data value is included in the formatted document in place of the detected second placeholder. For example, referring to FIG. 13, text formatter 1318 may include the data value determined in step 1704 in formatted document 108 in place of the placeholder.

For instance, in the current example, the data value of 400 determined in step 1704 may be included in a formatted document 108 as placeholder replacement text for the [AmountDue] placeholder.

In another example, FIG. 18 shows a flowchart 1800 providing a process for determining a display attribute to be applied to static text in a formatted document, according to an example embodiment. Flowchart 1800 may be performed in addition to flowchart 1400, or in place of steps 1408, 1410, and 1412. Furthermore, flowchart 1800 may be repeated for any number of expressions associated with static text in template 104. Flowchart 1800 is described as follows.

As shown in FIG. 18, flowchart 1800 starts at step 1802. In step 1802, a second data element referenced by a second expression associated with a portion of the static text in the dynamic document template is retrieved. Similarly to step 1408 described above, expression evaluator 1306 (FIG. 13) may be configured to detect a data element referenced by an expression associated with static text detected by static text recognizer 1312. Document formatter 1306 may be configured to retrieve the detected data element from data source 1304 as data element 1322.

In step 1804, the second expression is evaluated to determine a second display attribute. For example, referring to FIG. 13, expression evaluator 1306 may be configured to evaluate the expression according to data element 1322 retrieved in step 1802.

For instance, the expression IIF(Fields!Amount-Due.Value>=500, "Red", "Green") may be associated with the static text "The amount due is:" in the example XML code shown in the prior subsection. A data element 1322 value of "250" may be retrieved from data source 1304 with regard to the AmountDue.Value parameter in the expression. In this example, expression evaluator 1306 evaluates the expression IIF(Fields!AmountDue.Value>=500, "Red", "Green") for AmountDue.Value=250. Because 250 (AmountDue.Value) is less than 500, expression evaluator 1306 selects "Green" as the color display attribute.

In step 1806, the portion of static text is configured to be displayed according to the second display attribute. For example, referring to FIG. 13, text formatter 1318 may include the static text in formatted document 108. Furthermore, text formatter 1318 formats the static text in formatted document 108 according to the display attribute selected in step 1806.

For instance, in the current example, a data element 1322 value of "250" may be retrieved in step 1802, and the color display attribute of "Green" may be selected in step 1804. As such, the static text "The amount due is:" may be displayed in a formatted document 108 as static text in the color green (not indicated in FIG. 15).

As shown in FIG. 13, document formatter 1306 generates one or more formatted documents 108, which may be displayed by display 1302, may be stored in storage 304, may be printed, and/or may be otherwise utilized.

III. Further Example Embodiments

Template editor 402, template loader 404, data source selector 406, text editor module 408, placeholder designator module 410, expression editor module 414, GUI generator 602, document formatter 1306, template loader 1308, static text recognizer 1312, placeholder recognizer 1314, expression evaluator 1316, and text formatter 1318 may be implemented in hardware, software, firmware, or any combination thereof. For example, template editor 402, template loader 404, data source selector 406, text editor module 408, placeholder designator module 410, expression editor module 414, GUI generator 602, document formatter 1306, template loader 1308, static text recognizer 1312, placeholder recognizer 1314, expression evaluator 1316, and/or text formatter 1318 may be implemented as computer program code configured to be executed in one or more processors. Alternatively, template editor 402, template loader 404, data source selector 406, text editor module 408, placeholder designator module 410, expression editor module 414, GUI generator 602, document formatter 1306, template loader 1308, static text recognizer 1312, placeholder recognizer 1314, expression evaluator 1316, and/or text formatter 1318 may be implemented as hardware logic/electrical circuitry.

Figure 19:
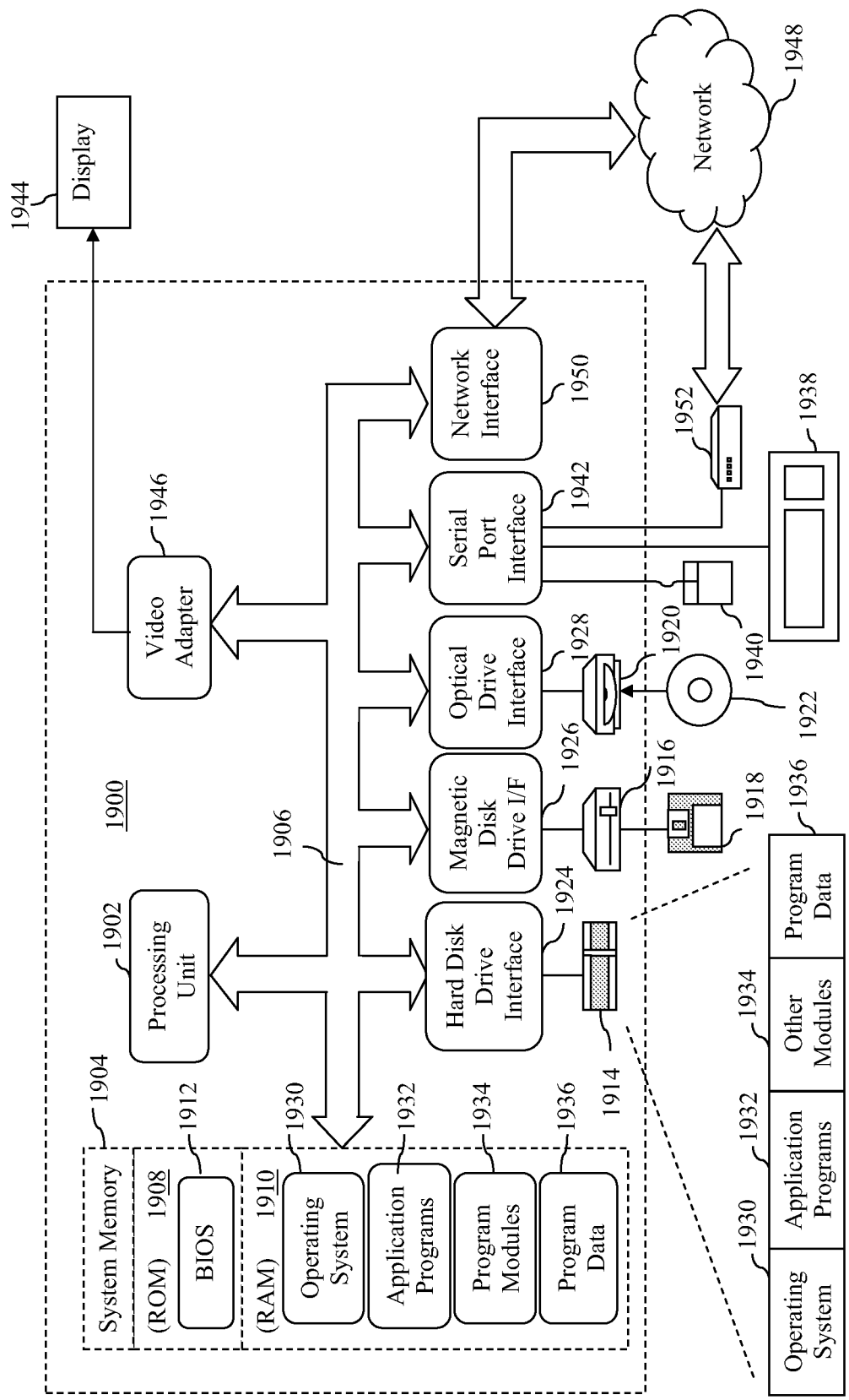
FIG. 19 shows a block diagram of an example computer system that may be used to implement embodiments of the present invention.

FIG. 19 depicts an exemplary implementation of a computer 1900 in which embodiments of the present invention may be implemented. For instance, first and second computer systems 302 and 306 (FIG. 3) may be implemented similarly to computer 1900, and may include one or more features of computer 1900 and/or alternative features. Computer 1900 may be a general-purpose computing device in the form of a conventional personal computer, a mobile computer, or a workstation, for example, or computer 1900 may be a special purpose computing device. The description of computer 1900 provided herein is provided for purposes of illustration, and is not intended to be limiting. Embodiments of the present invention may be implemented in further types of computer systems, as would be known to persons skilled in the relevant art(s).

As shown in FIG. 19, computer 1900 includes a processing unit 1902, a system memory 1904, and a bus 1906 that couples various system components including system memory 1904 to processing unit 1902. Bus 1906 represents one or more of any of several types of bus structures, including a memory bus or memory controller, a peripheral bus, an accelerated graphics port, and a processor or local bus using any of a variety of bus architectures. System memory 1904 includes read only memory (ROM) 1908 and random access memory (RAM) 1910. A basic input/output system 1912 (BIOS) is stored in ROM 1908.

Computer 1900 also has one or more of the following drives: a hard disk drive 1914 for reading from and writing to a hard disk, a magnetic disk drive 1916 for reading from or writing to a removable magnetic disk 1918, and an optical disk drive 1920 for reading from or writing to a removable optical disk 1922 such as a CD ROM, DVD ROM, or other optical media. Hard disk drive 1914, magnetic disk drive 1916, and optical disk drive 1920 are connected to bus 1906 by a hard disk drive interface 1924, a magnetic disk drive interface 1926, and an optical drive interface 1928, respectively. The drives and their associated computer-readable media provide nonvolatile storage of computer-readable instructions, data structures, program modules and other data for the computer. Although a hard disk, a removable magnetic disk and a removable optical disk are described, other types of computer-readable media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 1930, one or more application programs 1932, other program modules 1934, and program data 1936. Application programs 1932 or program modules 1934 may include, for example, computer program logic for implementing template editor 402, template loader 404, data source selector 406, text editor module 408, placeholder designator module 410, expression editor module 414, GUI generator 602, document formatter 1306, template loader 1308, static text recognizer 1312, placeholder recognizer 1314, expression evaluator 1316, text formatter 1318, flowchart 500, flowchart 700, step 1002, step 1102, flowchart 1200, flowchart 1400, flowchart 1700, and/or flowchart 1800 (including any step of flowcharts 500, 700, 1200, 1400, 1700, and/or 1800), and/or any further embodiments as described above.

A user may enter commands and information into the computer 1900 through input devices such as keyboard 1938 and pointing device 1940. Other input devices (not shown) may include a microphone, joystick, game pad, satellite dish, scanner, or the like. These and other input devices are often connected to the processing unit 1902 through a serial port interface 1942 that is coupled to bus 1906, but may be connected by other interfaces, such as a parallel port, game port, or a universal serial bus (USB).

A monitor 1944 or other type of display device is also connected to bus 1906 via an interface, such as a video adapter 1946. In addition to the monitor, computer 1900 may include other peripheral output devices (not shown) such as speakers and printers.

Computer 1900 is connected to a network 1948 (e.g., the Internet) through a network adaptor or interface 1950, a modem 1952, or other means for establishing communications over the network. Modem 1952, which may be internal or external, is connected to bus 1906 via serial port interface 1942.

As used herein, the terms "computer program medium" and "computer-readable medium" are used to generally refer to media such as the hard disk associated with hard disk drive 1914, removable magnetic disk 1918, removable optical disk 1922, as well as other media such as flash memory cards, digital video disks, random access memories (RAMs), read only memories (ROM), and the like.

As noted above, computer programs and modules (including application programs 1932 and other program modules 1934) may be stored on the hard disk, magnetic disk, optical disk, ROM, or RAM. Such computer programs may also be received via network interface 1950 or serial port interface 1942. Such computer programs, when executed or loaded by an application, enable computer 1900 to implement features of embodiments of the present invention discussed herein. Accordingly, such computer programs represent controllers of the computer 1900.

The invention is also directed to computer program products comprising software stored on any computer useable medium. Such software, when executed in one or more data processing devices, causes a data processing device(s) to operate as described herein. Embodiments of the present invention employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMs, nanotechnology-based storage devices, and the like.

IV. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method for configuring a dynamic document, comprising:
   enabling a data source to be associated with a dynamic document template;
   enabling static text to be inserted into the dynamic document template;
   enabling at least one placeholder for dynamic text to be inserted in the dynamic document template;
   enabling a first expression to be associated with a placeholder for dynamic text inserted in the dynamic document template, the expression referencing a data element of the data source, and being configured to determine a data value to be displayed in place of the placeholder for dynamic text;
   enabling a second expression to be associated with the placeholder for dynamic text, wherein the second expression is configured to apply a first display attribute to the displayed data value, wherein the first display attribute is based at least on the data value; and
   enabling a third expression to be associated with at least a portion of static text, wherein the third expression is configured to apply a second display attribute to the at least a portion of static text within the dynamic document template, wherein the second display attribute is based at least on the data value determined to be displayed in place of the placeholder for the dynamic text.

2. The method of claim 1, wherein the first display attribute includes at least one of a font, a color, a bold setting, an italics setting, a font size, a line spacing, or an effects setting.

3. The method of claim 1, wherein said enabling a first expression to be associated with a placeholder inserted in the dynamic document template comprises:
   enabling a user to interact with the placeholder to invoke a graphical user interface;
   displaying at least one static display attribute option in the graphical user interface that is selectable for association with the first placeholder; and
   enabling the user to interact with the graphical user interface to invoke an expression entry box in which the expression may be entered.

4. The method of claim 1, further comprising:
   generating the dynamic document template in extensible markup language (XML) form.

5. The method of claim 4, further comprising:
   generating a formatted document based on the generated dynamic document template.

6. A method for generating a formatted document, comprising:
   receiving a dynamic document template; and
   generating a formatted document based on the dynamic document template, said generating comprising:
   detecting static text in the dynamic document template;
   detecting one or more placeholders for dynamic text in the dynamic document template;
   including the detected static text in the formatted document; and retrieving a data value determined by an expression associated with a detected placeholder for dynamic text in the dynamic document template;

evaluating the expression to select a first display attribute for the data value;

evaluating the expression to select a second display attribute for a portion of the detected static text, wherein the second display attribute is based on the data value determined for the placeholder for dynamic text;

configuring the data value to be displayed in place of the detected placeholder;

configuring the portion of the detected static text to be displayed;

applying the first selected display attribute to the displayed data value in the generated formatted document; and applying the second display attribute to the portion of the displayed static text in the generated formatted document.

7. The method of claim 6, wherein said generating further comprises:

retrieving a second data element referenced by a second expression associated with a second detected placeholder in the dynamic document template;

evaluating the second expression to determine a second data value; and including the second data value in the formatted document in place of the second detected placeholder.

8. The method of claim 7, further comprising:

evaluating the second expression to determine a display attribute for the determined data value; and displaying the data value according to the determined display attribute in the formatted document in place of the detected placeholder.

9. The method of claim 6, wherein the first display attribute includes at least one of a font, a color, a bold setting, an italics setting, a font size, a line spacing, or an effects setting.

10. The method of claim 6, wherein said receiving a dynamic document template comprises:

receiving the dynamic document template in extensible markup language (XML) form.

11. A document generator, comprising:

at least one processing unit;

at least one system memory, communicatively coupled to the at least one processing unit and containing computer-readable instructions that, when executed by the at least one processing unit, configure a document formatter;

wherein the document formatter is configured to receive a dynamic document template and to generate a formatted document, the document formatter including:

a static text recognizer configured to detect static text in the dynamic document template, a placeholder recognizer configured to detect one or more placeholders for dynamic text in the dynamic document template, an expression evaluator, and a text formatter;

the document formatter being configured to include the static text in the formatted document and to retrieve from a data source associated with the dynamic document template at least one data element referenced by a first expression associated with a detected placeholder for dynamic text in the dynamic document template;

wherein the expression evaluator is configured to:

evaluate a second expression to select a first display attribute for the retrieved data element based at least on a data value of the data element determined by the expression evaluator; and evaluate a third expression to select a second display attribute for at least a portion of the detected static text, wherein the third expression is based on the data value for the placeholder for dynamic text;

wherein the text formatter is configured to include the determined data value in the formatted document in place of the placeholder and apply the first display attribute to the determined data value included in place of the placeholder in the formatted document, wherein the formatted document is generated based on the dynamic document template; and wherein the text formatter is configured to apply the second display attribute to the at least a portion of detected static text included in the formatted document.

12. The document generator of claim 11, wherein the document formatter is configured to retrieve a second data element referenced by a fourth expression associated with a detected second placeholder in the dynamic document template;

the expression evaluator is configured to evaluate the fourth expression to determine a second data value; and the text formatter is configured to include the second data value in the formatted document in place of the detected second placeholder.

13. The document generator of claim 12, wherein the expression evaluator is configured to evaluate a fifth expression to determine an additional display attribute for detected static text based on the determined data value; and the text formatter is configured to display the static text according to the determined additional display attribute.

14. The document generator of claim 11, wherein the document formatter is configured to retrieve a second data element referenced by a fourth expression associated with a portion of the detected static text in the dynamic document template;

the expression evaluator is configured to evaluate the second expression to select a second display attribute; and the text formatter is configured to display the portion of static text in the formatted document according to the selected second display attribute.

15. The document generator of claim 11, wherein the first display attribute includes at least one of a font, a color, a bold setting, an italics setting, a font size, a line spacing, or an effects setting.

16. The document generator of claim 11, wherein the dynamic document template is received in extensible markup language (XML) form.

17. The document generator of claim 11, wherein the static text recognizer is configured to parse dynamic document template to detect static text.

18. The document generator of claim 11, wherein the placeholder recognizer is configured to parse dynamic document template to detect one or more placeholders.

19. The document generator of claim 11, wherein the document formatter is further configured to generate a second formatted document, and the expression evaluator is further configured to:

evaluate the first expression to determine a second data value for the placeholder to be included in the second formatted document;

evaluate the a third expression to select an updated display attribute for the static text in the second formatted document.

20. The document generator of claim 19, wherein the text formatter is further configured to apply the updated display attribute to the portion of detected static text included in the second formatted document.

\* \* \* \* \*